Sept. 8, 1936.  E. KLAHN  2,054,055

APPARATUS FOR MINIMIZING FRICTION AND VIBRATION OF ROTOR ELEMENTS

Filed April 25, 1933

INVENTOR-
EMIL KLAHN
BY
Fred'k F. Schuetz
ATTORNEY-

Patented Sept. 8, 1936

2,054,055

REISSUED

UNITED STATES PATENT OFFICE 2,054,055

APPARATUS FOR MINIMIZING FRICTION AND VIBRATION OF ROTOR ELEMENTS

Emil Klahn, New Vernon, N. J.; Johanna Margaret Percival administratrix of said Emil Klahn, deceased Application April 25, 1933, Serial No. 667,814

13 Claims. (Cl. 308—9)

The invention relates to the reduction of friction in bearing constructions and to the production of substantially vibrationless rotor elements.

Among the objects of the invention is the provision of means for introducing a compressed gaseous medium between a rotor element and an associated stator element in such a manner that a substantially frictionless rotation therebetween is assured without any other lubrication, since all metal-to-metal contact therebetween is eliminated.

Another object of the invention resides in the particular and novel manner of distributing the compressed gaseous medium whereby a differential thrust is obtained thereby enabling rotation of the rotor element, the said gaseous medium serving also to accomplish the substantial elimination of friction between the two said elements.

Still another object of the invention resides in the novel method of balancing a rotor element by the use of the novel bearing construction.

In practicing the invention, provision is made for a stator and a movable or rotor element which are associated with each other for relative rotation; and one of these elements constituting the supporting member is provided with an axial duct for the admission of a suitable compressed gaseous medium and distribution of the same in the novel manner in the form of a separating layer or film between the surfaces of the two elements, which are in contact when at rest, whereby friction between the two coacting surfaces is eliminated for all practical purposes.

To this end, a radial port affords communication from the axial duct to the uppermost portion of the periphery of the corresponding element and discharges the gaseous medium into a preferably longitudinal exposed distributing recess provided, adjacently the port orifice, in the periphery of the said gas-supplying stator element. This distribution recess under inoperative conditions is sealed under the action of gravity upon the coacting supported member, and such recess is so designed that in operation the outflow of gaseous medium therefrom shall be so restricted that there will be no equalization of pressure throughout the space between the two elements; but, on the contrary, the pressure on the different areas of the supported element are unequal.

Moreover, the separating film develops only when the pressure of this gaseous medium is sufficient, as applied over the area of the orifice or distributing recess, to lift off or separate the supported member from the supporting member, that is to say, to overcome the weight of the former or counteract gravity action thereon.

In this connection, it is to be further understood that to secure the elimination of friction the operating pressure of the gas need be only slightly in excess of that required to effect the aforesaid separation of the elements. The gaseous medium, after flowing out of the orifice or distributing recess, is caused to flow therefrom all over the periphery of the supporting member, expanding in the gradually enlarging space afforded in the slight and eccentric separation of the elements and until said medium arrives, for example, at the underside of the supporting member where provision is made for exhausting the spent gaseous medium to the atmosphere as at the ends of the supported member. Intermediate discharge of the expanding gaseous medium may also be effected, if desired, by providing additional discharge grooves or channels angularly displaced from the distribution recess.

By providing a distribution recess or groove designed, as hereinafter described, to distribute a greater volume of the gaseous medium from one side than upon the other, it is possible to set up a differential pressure or thrust which may be caused to impart rotational movement to the rotor element of the bearing device, the speed of rotation being proportional to the pressure of the gaseous medium supplied in excess of that required to eliminate metal-to-metal contact of the coacting members.

Furthermore, where the bearing device is likely to be subjected to considerable external vibration, cushioning pockets for receiving and pocketing a portion of the gas may be provided over the periphery of the supporting member, or the supported member, or both.

The device herein described is peculiarly adapted for accomplishing the practically perfect balancing of rotors such, for example, as propellers, fly wheels, shafts, armatures, gyroscopes, turbine rotors, etc., as well as scale arms and the like.

The nature of the invention, however, will best be understood when described in connection with the accompanying drawing, in which.

Figure 1:
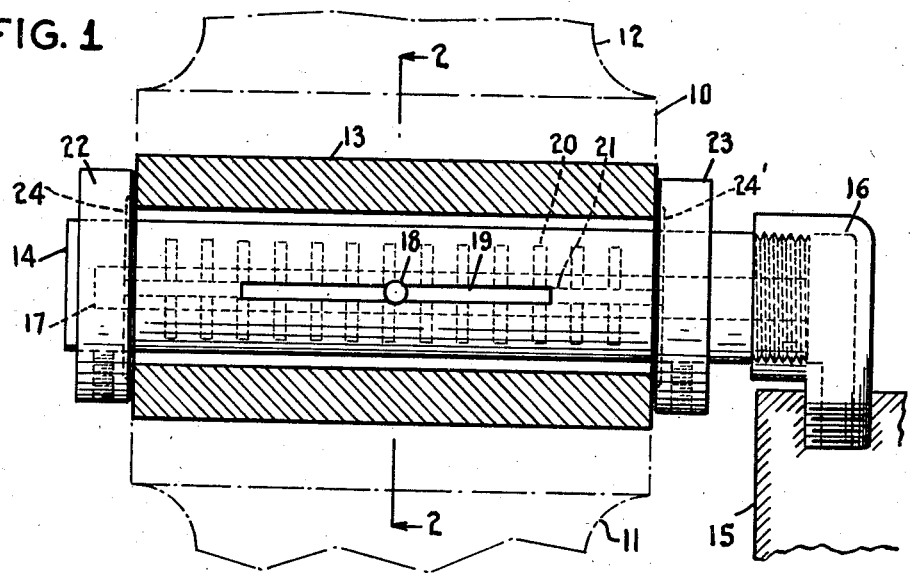
Fig. 1 is a fragmentary plan view of a balance apparatus, as one embodiment of my invention, a portion thereof being shown in longitudinal section.
Figure 2:
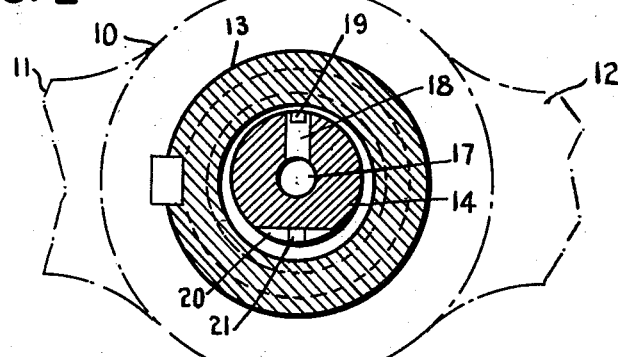
Fig. 2 is a transverse section taken on the line 2—2, Fig. 1 of the drawing.

Referring to the drawing, more especially Figs. 1 and 2 thereof, the particular embodiment of the invention shown therein is for the purpose of effecting a proper balancing, say of a rotor such as a propeller member having the hub 10 and arms 11 and 12, the hub for this purpose being shown as keyed to a rotor element as the sleeve or bushing 13 adapted to be supported by the stator element or supporting member, as the spindle 14. The latter is rigidly supported, for example, on a frame member 15 through a connection 16 suitable for supplying the gaseous medium under the required pressure. This medium is arranged, through the connection 16, to be introduced axially to the stator 14 which, to this end, is provided with an axial duct 17. The duct 17 in turn communicates with a radially disposed port 18 extending to the uppermost portion of the periphery of the stator 14, and terminates preferably in a distribution groove 19 provided longitudinally in the periphery thereof and adjacent the orifice of the port. The area of this groove is so proportioned in conformity with the pressure of the gas supplied through port 18 that the supported member, in this instance the rotor 13 which, when there is no gas applied, rests under its own weight over the said groove to seal off the same, will be only slightly raised by the intervening jet of gas, as indicated in Fig. 2 of the drawing (on a greatly exaggerated scale). This causes the supplied gas to be distributed over the periphery of stator 14 and in opposite directions from the groove 19 therein, the action then being independent of any increase of pressure which would merely cause additional volume and increase of flow between the two elements.

Having so located on the supported member or bushing 13 the selected rotor to be balanced, the air is introduced under sufficient pressure to effect the slight separation of such bushing from the supporting member or spindle 14 on which it rests. Thereupon, the selected rotor will assume or remain in a position with its heaviest portion at the lowest point, or in the plumbline. The rotor is then corrected or compensated in the usual manner until it remains stationary in any position in which it is set, thereby bringing its center of gravity coincident with its center of rotation and so eliminating vibration of the rotor when in use. By this method a perfect balance of a rotor element, such as a propeller, fly wheel, etc., can be accomplished and by an inexperienced operator; whereas in all cases in which mechanical bearings heretofore known are employed for the purpose of balancing a rotor, accurate balancing thereof is impossible due to the limitation resulting from the inherent friction of such bearings.

In the construction of the stator and rotor elements, it is desirable that careful machining of the same is secured so that but a few thousandths of an inch difference in diameters shall be had, say, .002 inch, in order that the flow of the escaping gas be sufficiently impeded and retarded to provide time for proper expansion toward the discharge and to effect the necessary aforesaid unequal pressure distribution in the intervening space. As a specific example, I have found that this difference in diameters between a stator and a rotor, in which the former is of ½" diameter, should desirably be less than 0.003 of an inch and between 0.001 and 0.0015 has been found to give excellent results.

Furthermore, if the difference is excessive, an unnecessary and uneconomical volume of gas is required for operation. The amount supplied need be sufficient only to allow an appreciable lubricating flow through a diameter differential of say at least 0.00075 which is about the lowest possible from a practical economical machining standpoint.

The orifice of the radial port is preferably also of relatively small diameter, say in the present instance .01 inch, for if the same be made much larger, undue and objectionable vibration of the parts results.

Also, for economical use of the gas and effective operation, the expansion must be gradual, and it will be observed, Fig. 2 of the drawing, that, under these conditions where the separation at the orifice is but slight, an eccentric relationship exists between the supporting and supported member whereby the space between their two coacting surfaces is of progressively increasing volume toward the underside so that the pressure thereof progressively drops.

This decrease in pressure may be further enhanced by the provision of a plurality of transverse expansion grooves 20 located in the underside of the periphery of the supporting member transversely to its length. For exhausting the spent gas from the underside of the said suppporting member, a longitudinal outlet groove 21 is provided therein at right angles to grooves 20, the same extending to the ends of the supported member or bushing 13 which is held on the supporting member 14 by suitable collars 22 and 23, as shown in Fig. 1. The latter, to assist in the discharge of the spent gas may be provided with recesses 24 and 24', respectively, in their inner faces and of a diameter exceeding that of the supporting member, said pockets serving at the same time as pneumatic end-thrust bearings.

Figure 3:
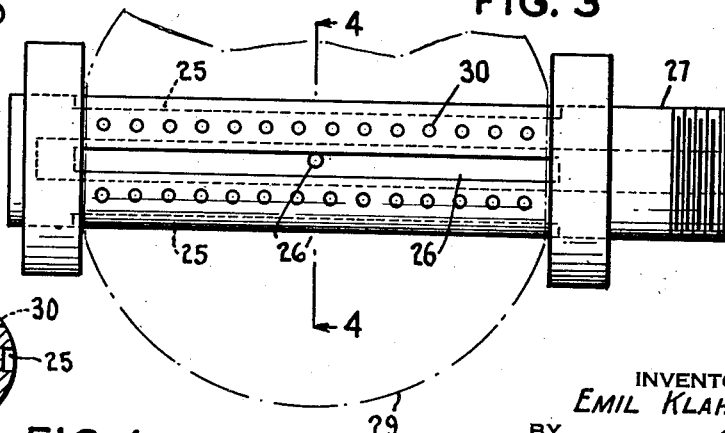
Fig. 3 is a plan view of the supporting member of the novel bearing device, and illustrates a modification.
Figure 4:
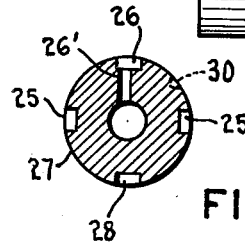
Fig. 4 is a transverse section therethrough taken on the line 4—4, Fig. 3 of the drawing.

Instead of the transverse expansion grooves indicated in Figs. 1 and 2, expansion of the gas may be enhanced by the provision of a series of longitudinal grooves 25, Figs. 3 and 4 of the drawing, and located between the distributing groove 26 of the supporting spindle 27, the said intermediate grooves as well as the bottom groove 28 continuing longitudinally of the periphery of the spindle to the ends of the coacting supported member 29 and serving thereby also as an outlet or discharge grooves for affording a greater pressure at the upper half of the spindle than at the lower half. It will be understood, of course, that all grooves and like expedients may be eliminated as the gas in any event will exhaust itself through the space at the ends of the supported member.

Where the coacting bearing elements are subjected to external vibration, a plurality of recesses or pockets 30 may be provided in the surface of the spindle 27 (or its coacting supported member, or both) to pocket a portion of the gas and afford thereby pneumatic cushions, serving to prevent metal-to-metal contact.

Figure 5:
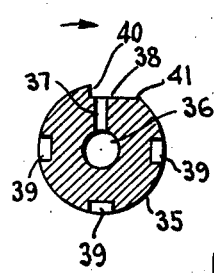
Fig. 5 is a similar transverse section illustrating a modification.

If it be desired to effect rotation of the rotatable element or rotor member of the novel combination, the gas supplied for substantial elimination of the friction therebetween may serve also to provide the motive force for this rotation. Thus, reference being had to Fig. 5 of the drawing, the supporting spindle 35 is provided with the axial duct 36 for supplying the gas under a pressure sufficient not only for the elimination of friction as aforesaid, but to provide also the motive power. The duct 36, as in the previously described embodiments, communicates through a radial port 37 with a distributing groove 38 provided longitudinally of the periphery of the spindle, and expansion ducts 39 may be provided longitudinally over the remaining surface of the spindle as in the embodiment shown in Figs. 3 and 4.

However, with respect to the distributing groove 38, provision is made for effecting a differential discharge or distribution of the gas when the supported member 29 separates from its coacting supporting member. Thus, the one wall 40 of the groove 38 is constructed of a greater height than the opposite longitudinal wall 41 (which in the present instance is shown as of zero height) so that a greater outflow of the supplied gas at the side corresponding to wall 41 will result; or, the orifice 26′, Figs. 3 and 4, may be placed to one side of the median line of its groove 26, or both expedients may be resorted to. This causes an unequal pressure distribution and opposite unequal thrusts, resulting in the rotation of the supported member 29 in the direction of the arrow; and, at the same time, the gas thus distributed serves to eliminate substantially friction between the coacting elements as hereinbefore described. It will be understood, of course, that if the speed of rotation is to be increased, it is necessary merely to provide the gas under a greater pressure; and that this will in no wise affect the friction elimination.

I claim:

1. A bearing device, comprising a rotor element and a stator element, one of said elements constituting a supporting member for the other element with a difference in diameters not exceeding a few thousandths of an inch, the said stator being provided with a longitudinally extending duct for supplying a gas under pressure and with a lateral discharge port on its periphery in communication with said duct, and means on the opposite side of said stator member from that of said exhaust port for relieving the pressure of such gas below that of such inlet pressure whereby gas discharged from the port will separate the two elements and be distributed therebetween with its volume increasing progressively toward the under side of the stator and will exhaust freely into the atmosphere.

2. A bearing device, comprising a rotor element and a stator element, one of said elements constituting a supporting member for the other element with a difference in diameters not exceeding a few thousandths of an inch, and the said stator being provided with a longitudinally extending duct for supplying a gas under pressure and with a lateral discharge port on its periphery in communication with said duct, whereby gas discharged from the port will separate the two elements and be distributed therebetween with its volume increasing progressively toward the under side of the stator, a discharge groove being provided longitudinally in the periphery of said stator along its under side and extending respectively to the ends of the rotor and which discharge groove is in free communication with the external atmosphere.

3. A bearing device, comprising a rotor element and a stator element, one of said elements constituting a supporting member for the other element with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, whereby gas discharged from the port will separate the two elements and be distributed therebetween with its volume increasing progressively toward the under side of the stator, and collars on the supporting member at opposite ends of the rotor for retaining the latter against endwise movement, said collars being provided over their respective inner surfaces with recesses for the spent gas.

4. A bearing element, comprising a rotor element and a stator element, one of said elements constituting a supporting member for the other element with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, and the periphery of the stator having a longitudinal groove receiving gas from said port and of an area relative to the pressure of the gas to lift the rotor slightly off the stator whereby gas discharged from the port will separate the two elements and be distributed therebetween with it volume increasing progressively toward the underside of the stator.

5. A bearing device, comprising a rotor element and a stator element, one of said elements constituting a supporting member for the other element with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, whereby gas discharged from the port will separate the two elements and be distributed therebetween with its volume increasing progressively toward the under side of the stator, a discharge groove being provided longitudinally in the periphery of said stator along its under side to the ends of the rotor, and transverse expansion grooves being provided over the under surface of the stator and communicating with its longitudinal discharge groove.

6. A bearing device, comprising a rotor element and a stator element, one of said elements constituting a supporting member for the other element with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, whereby gas discharged from the port will separate the two elements and be distributed therebetween with its volume increasing progressively toward the under side of the stator, a discharge groove being provided longitudinally in the periphery of said stator along its under side to the ends of the rotor, and longitudinal expansion grooves being provided in the periphery of said stator intermediate the orifice of the radial port and outlet groove.

7. A bearing device, comprising a rotor element and a stator element, one of said elements constituting a supporting member for the other element ment with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, whereby gas discharged from the port will separate the two elements and be distributed therebetween with its volume increasing progressively toward the under side of the stator, and the coacting surface of an element being provided with a plurality of recesses to pocket the gas for affording pneumatic cushions between the elements.

8. A bearing device, comprising a rotor element and a stator element, one of said elements constituting a supporting member for the other element with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, and the periphery of the stator having a longitudinal groove receiving gas from said port and of an area relative to the pressure of the gas to lift the rotor slightly off the stator, said port discharging therein at one side of the median line of the groove, whereby gas discharged from the port will separate the two elements and be distributed therebetween with its volume increasing progressively toward the under side of the stator, and effect rotation of the rotor element.

9. A bearing device, comprising a rotor element and a stator element, one of said elements constituting a supporting member for the other element with a difference in diameters not exceeding a few thousandths of an inch, and the said stator being provided with a longitudinally extending duct for supplying a gas under pressure and with a longitudinally extending duct for supplying gas under pressure and with a lateral discharge port in its periphery in communication with said duct, and the periphery of the stator having a longitudinal groove receiving gas from said port and of an area relative to the pressure of the gas to lift the rotor slightly off the stator and the one wall of the distributing groove being at a level below that of the other wall thereof, whereby gas discharged from the port will separate the two elements and be distributed therebetween with its volume increasing progressively toward the under side of the stator and effect rotation of the rotor element.

10. A bearing device, comprising a cylindrical rotor element and a cylindrical stator element, the one enveloping the other and one of said elements constituting a supporting member for the other element, the internal diameter of the enveloping element not exceeding the external diameter of the enveloped element by more than a few thousandths of an inch, and the said stator being provided with a longitudinally extending duct for supplying a gas at its periphery and at one side only with a waste gas outlet angularly displaced therefrom and in communication with an area of lower pressure than that in the space between said elements and which outlet is of sufficient size to prevent the equalization of air pressure within such latter space.

11. A bearing device, comprising a rotor element and a stator element, one of said elements constituting a supporting member for the other element with a difference in diameters not exceeding a few thousandths of an inch, and the said stator being provided with a longitudinally extending duct for supplying a gas at its periphery and at one side only with a waste gas outlet below the longitudinal axis of said stator element, which is so correlated inside to the free space between the longitudinal surfaces of said elements at the most contracted portion of said space above the bottom of the inner element as to prevent the setting up of back-pressure and thereby insuring a differential of pressure on the top and bottom of the inner element.

12. A bearing device, comprising a rotor element and a stator element, one of said elements constituting a supporting member for the other element with a difference in diameters not exceeding a few thousandths of an inch, and the said stator being provided with a longitudinally extending duct for supplying a gas at its periphery and at one side only and an exhaust duct discharging at the end of one of the elements and in communication with a low pressure area less than the pressure between the longitudinal adjacent surfaces of said element for preventing equalization of gas pressure in the space surrounding the inner element whereby a gradually diminishing pressure of the discharged gas may be established toward the unsupported portion of the rotor member.

13. A bearing device, comprising a rotor element and a stator element, one of said elements constituting a supporting member for the other element with a difference in diameters not exceeding a few thousandths of an inch, and the said stator being provided with a longitudinally extending duct for supplying a gas at its periphery and at one side only and an exhaust duct discharging at the end of one of the elements and in communication with a low pressure area less than the pressure between the longitudinal adjacent surfaces of said element for preventing equalization of gas pressure in the space surrounding the inner element, whereby gas passing through the duct will separate the two members and be distributed therebetween with a progressive increase of volume about the periphery of the stator.

EMIL KLAHN.